United States Patent [19]
Landin et al.

[11] Patent Number: 5,538,774
[45] Date of Patent: Jul. 23, 1996

[54] INTERNALLY DAMPED ROTATABLE STORAGE ARTICLE

[75] Inventors: Donald T. Landin; Jeffrey W. McCutcheon, both of Eagan, Minn.

[73] Assignee: Minnesota Mining and Manufacturing Company, Saint Paul, Minn.

[21] Appl. No.: 282,574

[22] Filed: Jul. 29, 1994

[51] Int. Cl.$^6$ .................................................... B32B 3/00
[52] U.S. Cl. .................... 428/64.1; 428/64.2; 428/64.4; 428/323; 428/325; 428/327; 428/329; 428/416; 428/913; 430/270.11; 430/495.1; 430/945; 369/283; 369/287; 369/288
[58] Field of Search ........................ 428/64, 65, 913, 428/402, 64.1, 64.2, 64.4, 323, 325, 327, 329, 411.1, 414, 416; 430/270, 495, 945; 369/283, 287, 288

[56] References Cited

U.S. PATENT DOCUMENTS

| | | | |
|---|---|---|---|
| 2,819,032 | 1/1958 | Dietrie et al. | 244/119 |
| 3,071,217 | 1/1963 | Gould | 189/34 |
| 3,078,969 | 2/1963 | Campbell et al. | 189/37 |
| 3,159,249 | 12/1964 | Lszan | 189/34 |
| 3,160,549 | 12/1964 | Caldwell et al. | 161/161 |
| 4,195,713 | 4/1980 | Hagbjer et al. | 181/1 B |
| 4,871,429 | 9/1989 | Fujita et al. | 346/137 |
| 5,183,863 | 2/1993 | Nakamura et al. | 525/438 |
| 5,219,708 | 6/1993 | Hirata | 430/271 |
| 5,262,232 | 11/1993 | Wilfong et al. | 428/327 |
| 5,308,887 | 5/1994 | Ko et al. | 522/148 |
| 5,356,715 | 10/1994 | Levine | 428/416 |

FOREIGN PATENT DOCUMENTS

| | | | |
|---|---|---|---|
| 0341785 | 11/1989 | European Pat. Off. | G11B 7/24 |
| 0507515A2 | 10/1992 | European Pat. Off. | G11B 11/10 |
| 8504837.2 | 2/1985 | Germany | G11B 7/24 |
| 60-39962 | 3/1985 | Japan | H04L 27/00 |
| 60-187951 | 9/1985 | Japan | G11B 7/24 |
| 2-94141 | 4/1990 | Japan | G11B 7/24 |
| 3-142893 | 6/1991 | Japan | H05K 1/02 |
| 4-28031 | 1/1992 | Japan | G11B 7/24 |
| 4-53837 | 2/1992 | Japan | C08J 5/04 |
| 4-341943 | 11/1992 | Japan | G11B 7/24 |
| 5-182241 | 7/1993 | Japan | G11B 7/24 |

*Primary Examiner*—Patrick J. Ryan
*Assistant Examiner*—Elizabeth Evans
*Attorney, Agent, or Firm*—Gary L. Griswold; Walter N. Kirn; Janice L. Dowdall

[57] ABSTRACT

The present invention provides a method for internally damping a rotatable storage article which is subject to resonant vibrations. More specifically, the present invention provides a method of improving the damping properties of a rotatable storage article by introducing a viscoelastic material as an inner layer(s) of the rotatable storage article. The invention also provides the damped rotatable storage articles themselves.

33 Claims, 4 Drawing Sheets

INTERNALLY DAMPED ROTATABLE STORAGE ARTICLE

FIELD OF THE INVENTION

The present invention relates to a method for internally damping a rotatable storage article which is subject to resonant vibrations. More specifically, the present invention relates to a method of improving the damping properties of a rotatable storage article by introducing a viscoelastic material as an inner layer(s) of the rotatable storage article. The invention also relates to the damped rotatable storage articles themselves.

BACKGROUND OF THE INVENTION

Periodic or random vibrations or shocks can excite the resonant frequencies in a rotatable storage article which can be problematic due to the resultant formation of undesirable stresses, displacements, fatigue, and even sound radiation. Such undesirable vibrations or shocks are typically induced by external forces and can be experienced by a wide variety of articles and under a variety of conditions. For example, resonant vibrations can cause excessive vertical displacement of art optical disk's surface during operation which may lead to poor laser focus. Proper laser focus is a key to optimum write/read characteristics, signal quality, and tracking ability.

Various techniques have been used to reduce vibrational and shock effects (stresses, displacements, etc.) on storage articles. Three basic techniques to reduce vibration and shock effects include 1) adding stiffness or mass to the rotatable storage article so that the resonant frequencies of the rotatable storage article are not excited by a given excitation source, 2) isolating the rotatable storage article from the excitation so the vibrational or shock energy does not excite the rotatable storage article's resonant frequencies, and 3) damping the rotatable storage article so that given excitations do not result in excessive negative effects at the resonant frequencies of the rotatable storage article.

An isolation technique for limiting vibration transmission is described in U.S. Pat. No. 4,870,429 issued Sep. 26, 1989. A single-sided or double-sided optical disk structure is described which includes two sheets of substrate bonded to each other with a foam spacer interposed between the two substrates to restrict or isolate the vibrations caused by external forces. The spacer is made from an elastomeric foam material and is positioned between the two substrates to restrict the transmission of such forces (e.g. vibrations or shocks). The thickness of the spacer is stated to be preferably not less than 0.2 mm, more preferably not less than 0.4 mm, because when the thickness is too small the effect of the spacer to restrict or isolate forces is not exhibited sufficiently. Such a system adds to the overall size of the rotatable storage article and may be impractical where close positioning of the article to other structures is desired.

Two types of surface or external damping treatments which can be used to reduce shock or vibration impact on rotatable articles are: (1) free layer damping treatments; and (2) constrained layer damping treatments. Both of these damping treatments, Dan provide high levels of damping to a structure, i.e., dissipation of undesirable vibrations, without sacrificing the stiffness of the structure. The use of viscoelastic materials as exterior surface damping treatments is described in EP 0507515 published Oct. 7, 1992. Examples of additional surface or external damping techniques are described, for example, in U.S. Pat. Nos. 2,819,032 (issued Jan. 7, 1953); 3,071,217 (issued Jan. 1, 1963); 3,078,969 (issued Feb. 26, 1963); 3,159,249 (issued Dec. 1, 1964); and 3,160,549 (issued Dec. 8, 1964). All of the aforementioned damping techniques can add complexity and expense to the design of the rotatable storage article, limit the amount of exterior article surface available for data storage, and can increase the overall size of the article.

Free layer damping; treatment is also referred to as "unconstrained layer" or "extensional damping" treatment. In this technique, damping occurs by applying a layer of viscoelastic damping material to one or more exterior surfaces of the article to be damped. The material can be applied to one or more exterior surfaces of the article to be damped. The mechanism by which this treatment method dissipates undesirable energy, e.g., resonant vibrations, involves deformation. That is, when the article is subjected to cyclic loading, for example, the damping material is subjected to tension-compression deformation and dissipates the energy through an extensional strain mechanism.

Constrained layer damping treatment is also referred to as "shear damping" treatment. For a given weight, this type of damping treatment is generally more efficient than the free layer damping treatment. In this technique, damping occurs by applying a damper consisting of one or more layers of viscoelastic damping material and one or more layers of a higher tensile modulus material to one or more exterior surfaces of the article to be damped. That is, this damping technique is similar to the free layer damping treatment wherein a viscoelastic material is applied to one or more exterior surfaces of a structure, the difference being that the viscoelastic material is additionally constrained by a layer having a higher modulus than the viscoelastic material, e.g., a metal layer, in the constrained layer treatment. Energy dissipates from the viscoelastic damping material via a shear strain mechanism. The shear strain results from constraints by the higher modulus constraining layer and the base structure.

Although these exterior surface damping techniques are used, the degree of damping is oftentimes limited by thickness or spacing requirements as well as application difficulties. Furthermore, the exterior damper must be applied to potential data storage surface areas, limiting information storage capability. In addition, external dampers can interfere with information retrieval from the storage article. Another disadvantage is that the external damper may be subject to degradation by the environmental conditions in which it is used. As way of example, if a rotatable storage article is desired to be a component in a size limited application, such as hard disk drives for portable computer systems, computers, or calculators, the ability to adequately damp the rotatable storage article by means of an "add-on" exterior surface damper may not be possible due to overall thickness requirements to meet a "form factor" requirement or the necessity of using the exterior surface for data/ information storage. Thus, an alternative approach is needed to damp vibrational or shock energy without adversely affecting the overall size or thickness or available surface area of the rotatable storage article.

SUMMARY OF THE INVENTION

We have found such an alternative approach. The present invention provides an internally damped rotatable storage article.

The term "rotatable storage article" as used herein refers to a media that has information stored on it and/or which is capable of storing information. The article is typically capable of being rotated in some manner that allows the data stored on the article to be passed by a read or write element to allow reading of information from the article, or writing of information on the article, or both. Examples of storage articles include rigid disk drive disks, optical disks, compact disks (CDs), magneto-optical disks, records, drums, floppy disks and the like.

The present invention also provides a method of improving the vibrational damping characteristics of a rotatable storage article by providing an internally damped rotatable storage article. The method typically involves incorporating one or more layers of a vibration damping material into the storage article typically by adding one layer or a plurality of layers of a damping material during the manufacture of the rotatable storage article as an inner layer. The layer(s) may be continuous or discontinuous. The discontinuous layer may be separated by space(s) and/or a non-damping material. A continuous layer may comprise the same damping material or different damping material adjacent to each other, thereby forming a continuous surface.

The vibration damping material includes a viscoelastic material or combination of different viscoelastic materials. Useful viscoelastic materials are those having a storage, modulus of at least about 1.0 psi (6.9×10$^3$ Pascals) and a loss factor of at least about 0.01, at the temperature and frequency of use. Advantageously and preferably, a layer(s) of the vibration damping material is placed in areas of high strain energy as an inner layer(s) to provide improved damping in the desired frequency and temperature range. The added damping layer(s) increases the vibrational damping, as measured by the system loss factor, of the rotatable storage article or the structural material of which it is made, by at least about 10% in at least one vibrational mode. System loss factor is a measure of the damping in a structure.

In certain preferred embodiments, the vibration damping material also includes an effective amount of a fibrous material. The vibration damping material preferably includes an amount of fibrous material effective to improve vibration damping of the article or the structural material of which the article is made by a factor of at least about two in strain energy ratio of at least one vibrational mode. Typically, this requires incorporating about 3 to 60 wt % of the fibrous material into the vibration damping material, based on the total weight of the vibration damping material. Preferably, the fibrous material is a nonmetallic fibrous material, such as glass.

In another preferred embodiment, the vibration damping material also includes an effective amount of a particulate material. The vibration damping material preferably includes an amount of particulate material effective to improve vibrational damping of the article or the structural material of which the article is made by a factor of at least about two in strain energy ratio of at least one vibrational mode. Typically, this requires incorporating about 0.5 to 70 weight percent of the particulate material into the vibration damping material, based on the total weight of the vibration damping material. Combinations of particulate and fibrous materials may be used, typically about 0.5 to about 70 wt. % based on the total damping material. Additionally, in certain preferred embodiments, the vibration damping material that provides the significant portion of the damping for a given material layer also includes an effective amount of an epoxy resin (with or without the particulate or fibrous material) dispersed within the damping material. The vibration damping material preferably includes an amount of epoxy resin effective to improve the mechanical integrity of the rotatable disk storage article or the structural material of which the rotatable disk storage article is made. The epoxy resin material may optionally having damping properties. An example of a suitable damping material incorporating an epoxy resin is disclosed in U.S. Pat. No. 5,262,232 (issued Nov. 13, 1993), incorporated herein by reference. Typically, the amount of epoxy resin incorporated into the vibration damping material is about 0.5 to 95 weight percent, preferably about 5 to about 50 weight percent, based on the total weight of the vibration damping material.

DETAILED DESCRIPTION OF THE INVENTION

Figure 1:
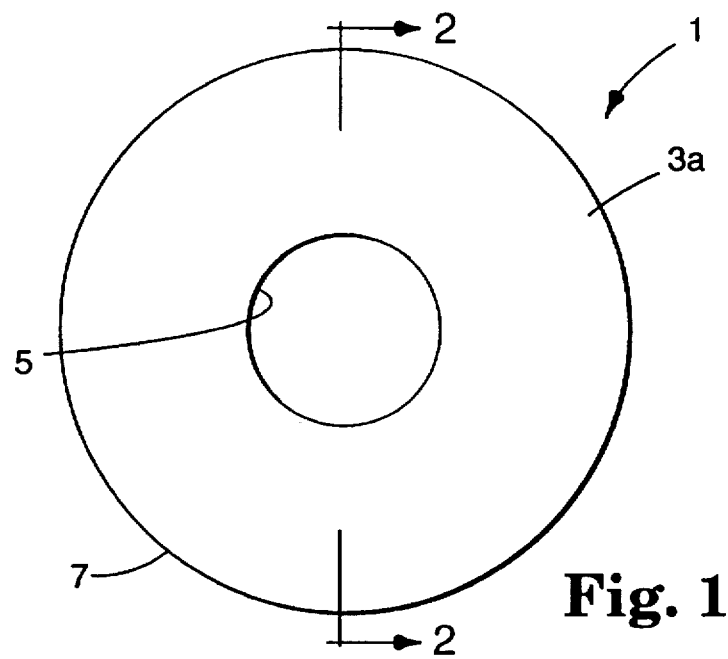
FIG. 1 is a schematic top view of a "disk type" rotatable storage article of the present invention having a continuous single layer of a vibrational damping material placed near the center of the article's thickness.

The present invention provides a method of improving damping properties of rotatable storage articles, and thereby solving vibration problems in a variety of applications where rotatable storage articles are exposed to vibration or shock. More specifically, the present invention provides a vibration and shock resistant internally damped rotatable storage article that uses a highly dissipative damping material, with a loss factor of at least about 0.01 at a given frequency and temperature, preferably at least about 0.1. This damping material, when placed in the rotatable storage article as inner layer(s), can be exposed to significant amounts of strain energy in various vibrational modes of interest and dissipates a portion of this vibrational energy as heat, thereby diminishing vibration and shock displacement oscillations. The present invention functions so as to damp, i.e., reduce the vibrational or shock amplitude or duration of, a wide variety of vibrational modes, e.g., bending, torsion, sway, and extensional modes, in a wide variety of rotatable storage article designs and over a wide frequency and temperature range. It can be applied to situations in which exterior surface treatments, such as constrained layer treatments, are typically used and are especially useful where overall size of the article is important.

The method of the present invention typically involves the incorporation of a vibration damping material as one or more interior layers of the rotatable storage article laminate. The vibration damping material may be layered in between the structural material, e.g., aluminum and it alloys, polyester, ceramic, polycarbonate, glass, and/or vinyl, etc. of the rotatable storage article. Preferably, the laminated material has the damping material laminated, sprayed, silk screened, or cast onto one or more layers of structural material. The damping material layer can be continuous, or discontinuous. The final rotatable storage article design can have the damping material encased around the edges using, for example, metal or plastic or sealed with adhesive, tape, or by sonic bonding or the like so that the damping material is substantially completely surrounded by, i.e., encased or enclosed within, the structural material, which provides protection of the damping material from environmental conditions. Alternately, the damping material can be exposed at the perimeter edges or cutouts within the rotatable storage article, which is preferred from a damping standpoint. The addition of the damping material into the laminate structure results in creating an inherently damped rotatable substrate laminate that can be further processed to add magnetic or optical recording coatings and an opening for a hub or spindle.

The damping layer may substantially form a layer having about the same dimensions as the substrate layers between which it is sandwiched. Alternately, the layer may be of more limited dimensions and may be situated in an area of greatest vibrational stresses.

Typically, an amount of the damping material is present such that the damping characteristics of the rotatable storage article are improved. Preferably, a sufficient amount of the vibration damping material is used such that the damping is improved by at least about 10% in at least one vibrational mode. As a result of this technique, high mechanical strains are introduced into the damping material when the structure is excited at one or more of its natural frequencies. A portion of the resulting mechanical strain energy in the damping material is then dissipated in the form of heat. The higher the strain energy in the damping material, the more vibration energy is dissipated from the rotatable storage article structure.

The placement of a partial layer of damping material in the rotatable storage article can be influenced by whether the article edges are sealed. This can alter the stiffness of the rotatable storage article and determine areas of greater vibrational activity for a given vibrational or shock excitation of one of the modes of vibration in a certain area of the rotatable storage article. That is, the partial vibration damping material layer(s) are placed in the article where one or more vibrational modes are active. By such placement, the amount of strain energy that is generated in the damping material used for the rotatable storage article can be maximized. The identification of these locations can be determined by one of skill in the art using modal analysis or finite element analysis.

The rotatable storage article's structure damped by the method of the present invention can be prepared from any material suitable for rotatable storage article designs. Useful structural materials include, for example, metals such as aluminum and aluminum alloys; organic materials/resins such as polyester, polycarbonate and vinyl; and inorganic materials such as glass and ceramic. Additional materials such as magnetic or optical coatings, wear resistant overcoats and lubricants may also be used for preparing the data storage surface(s) of the article of the invention.

The vibration damping material can include any material that is viscoelastic. A viscoelastic material is one that is viscous, and therefore capable of dissipating energy, yet exhibits certain elastic properties, and therefore capable of storing energy. That is, a viscoelastic material is an elastomeric material typically containing long-chain molecules that can convert mechanical energy into heat when they are deformed. Such a material typically can be deformed, e.g., stretched, by an applied load and gradually regain its original shape, e.g., contract, sometime after the load has been removed.

Suitable viscoelastic materials for use in the vibration damping materials of the present invention have a storage modulus, i.e., measure of the energy stored during deformation, of at least about 1.0 psi ($6.9 \times 10^3$ Pascals). The storage modulus of useful viscoelastic materials can be as high as 500,000 psi ($3.45 \times 10^9$ Pascals); however, typically it is about 10–2000 psi ($6.9 \times 10^4$ –$1.4 \times 10^7$ Pascals).

Suitable viscoelastic materials for use in the vibration damping materials of the present invention have a loss factor, i.e., the ratio of energy loss to energy stored, of at least about 0.01. Preferably the loss factor is at least about 0.1, more preferably about 0.5–10, and most preferably about 1–10, in the frequency and temperature range where damping is required (typically about 1–10,000 Hz and –40° to 100° C. This loss factor is a measure of the material's ability to dissipate energy and depends on the frequency and temperature experienced by the damping material. For example, for a crosslinked acrylic polymer, at a frequency of 100 Hz, the loss factor at 68° F. (20° C.) is about 1.0, while at 158° F. (70° C.) the loss factor is about 0.7.

Preferred viscoelastic materials are those that remain functional over a wide range of temperatures, e.g., –40° F. (–40° C.) to 300° F. (149° C.). Most preferred viscoelastic materials are those that cover the broadest temperature and frequency range at the desired minimum loss factor and storage modulus to achieve acceptable damping of the rotatable storage article, and do not experience a significant degradation in properties due to long times at high temperatures or short excursions beyond these high temperature levels.

Useful viscoelastic damping materials can be isotropic as well as anisotropic materials, particularly with respect to its elastic properties. As used herein, an "anisotropic material" or "nonisotropic material" is one in which the properties are dependent upon the direction of measurement. Suitable viscoelastic materials include urethane rubbers, silicone rubbers, nitrile rubbers, butyl rubbers, acrylic rubbers, natural rubbers, styrene-butadiene rubbers, and the like. Other useful damping viscoelastic materials include polyesters, polyurethanes, polyamides, ethylene-vinyl acetate copolymers, polyvinyl butyral, polyvinyl butyral-polyvinyl acetate copolymers, epoxy-acrylate interpenetrating networks and the like. Specific examples of useful materials are disclosed or referenced in U.S. Pat. No. 5,183,863 (issued Feb. 2, 1993), U.S. Pat. No. 5,262,232 (issued Nov. 16, 1993) and U.S. Pat. No. 5,308,887 (issued May 3, 1994), all of which are incorporated herein by reference.

Examples of thermoplastic materials suitable for use as the vibration damping material in rotatable storage articles according to the present invention include, but are not limited to, those selected from the group consisting of polyacrylates, polycarbonates, polyetherimides, polyesters, polysulfones, polystyrenes, acrylonitrile-butadiene-styrene blockcopolymers, polypropylenes, acetal polymers, polyamides, polyvinyl chlorides, polyethylenes, polyurethanes, and combinations thereof.

Useful viscoelastic materials can also be crosslinkable to enhance their strength. Such viscoelastics are classified as thermosetting resins. When the viscoelastic material is a thermosetting resin, then prior to the manufacture of the damped storage article The thermosetting resin is in a thermoplastic state. During the manufacturing process, the thermosetting resin is cured and/or crosslinked typically to a solid state, although it could be a gel upon curing as long as the cured material possesses the viscoelastic properties described above. Depending upon the particular thermosetting resin employed, the thermosetting resin can include a curing agent, e.g., catalyst, which when exposed to an appropriate energy source (such as thermal energy) the curing agent initiates the polymerization of the thermosetting resin. Particularly preferred viscoelastic damping materials are those based on acrylates.

In general, any suitable viscoelastic material can be used. The choice of viscoelastic material for a particular set of conditions, e.g., temperature and frequency of vibration, etc., is within the knowledge of one of skill in the art of viscoelastic damping. It is to be understood that blends of any of the foregoing materials can also be used.

In addition to the viscoelastic material, the vibration damping material of certain preferred embodiments of tile present invention includes an effective amount of a fibrous and/or particulate material. Herein, an "effective amount" of a fibrous material or particulate is an amount sufficient to impart at least improvement in desirable characteristics to the viscoelastic material, but not so much as to give rise to any significant detrimental effect on the structural, magnetic, optical (e.g., degrade read/write capability), or electrical integrity of the rotatable storage article in which the viscoelastic material is incorporated. Generally, the fibrous or particulate material is used in an amount effective to increase the strain energy ratio of a component containing the same amount and type of viscoelastic material without the fibrous or particulate material. Generally, an increase in the strain energy ratio of a factor of at least about two in at least one vibrational mode is desired. Typically, the amount of the fibrous material in the viscoelastic material is within a range of about 3–60 wt %, preferably about 10–50 wt %, more preferably about 15–45 wt %, and most preferably about 20–40 wt %, based on the total weight of the vibration damping material. Typically, the amount of the particulate material in the viscoelastic material is within a range of about 0.5–70 wt %, preferably about 1–45 wt %, more preferably about 5–40 wt %, and most preferably about 5–30 wt %, based on the total weight of the vibration damping material.

The fibrous material can be in the form of fibrous strands or in the form of a fiber mat or web, although fibrous strands are preferred. The fibrous strands can be in the form of threads, cords, yarns, filaments, etc., as long as the viscoelastic material can wet the surface of the material. They can be dispersed randomly or uniformly in a specified order. Preferably, the fibrous strands, i.e., fibers or fine threadlike pieces, have an aspect ratio of at least about 2:1, and more preferably an aspect ratio within a range of about 2:1 to about 10:1. The aspect ratio of a fiber is the ratio of the longer dimension of the fiber to the shorter dimension.

The fibrous material can be composed of any material that increases the damping capability of the viscoelastic material. Examples of useful fibrous materials in applications of the present invention include metallic fibrous materials, such as aluminum oxide, magnesium, or steel fibers, as well as nonmetallic fibrous materials, such as fiberglass. Generally, high Young's modulus fibrous materials, i.e., those having a modulus of at least about 1,000,000 psi ($6.9 \times 10^9$ pascals), are preferred. Most preferably, the fibrous material is nonmetallic. The nonmetallic fibrous materials can be a variety of materials, including, but not limited to, those selected from the group consisting of glass, carbon, minerals, synthetic or natural heat resistant organic materials, and ceramic materials. Preferred fibrous materials for rotatable storage articles of the present invention ate organic materials, glass, and ceramic fibrous material.

By "heat resistant" organic fibrous material, it is meant that useable organic materials should be sufficiently resistant to melting, or otherwise softening or breaking down under the conditions of manufacture and use of the rotatable storage article of the present invention. Useful natural organic fibrous materials include, but are not limited to, those selected from the group consisting of wool, silk, cotton, and cellulose. Examples of useful synthetic organic fibrous materials include, but are not limited to, those selected from the group consisting of polyvinyl alcohol, nylon, polyester, rayon, polyamide, acrylic, polyolefin, aramid, and phenol. The preferred organic fibrous material for applications of the present invention is aramid fibrous material. Such a material is commercially available from Dupont Co., Wilmington, Del. under the tradenames of "Kevlar" and "Nomex".

Generally, any ceramic fibrous material is useful in applications of the present invention. An example of a ceramic fibrous material suitable for the present invention is NEXTEL™ which is commercially available from Minnesota Mining and Manufacturing Co., St. Paul, Minn. Examples of useful, commercially available, glass fibrous material are those available from PPG Industries, Inc. Pittsburgh, Pa., under the product name E-glass bobbin yarn; Owens Corning, Toledo, Ohio, under the product name "Fiberglass" continuous filament yarn; and Manville Corporation, Toledo, Ohio, under the product name "Star Rov 502" fiberglass roving.

Advantages can be obtained through use of fibrous materials of a length as short as about 100 micrometers. The fibers are not limited in length but much longer fibers may provide insufficient fiber interface and therefore decreased shearing surfaces between fibers. The fiber thickness or diameter for typical fibrous material ranges from about at least 5 micrometers. The thinner the fiber, the higher the surface area of the fibrous material. Thus, preferred fibrous materials are very thin. The thickness of the fiber is also dependent upon the desired thickness; of the overall damping material layer that will be used in the rotatable storage article. Thus, many common fibers may not be suitable if the overall damping material thickness is relatively thin (e.g., 4–10 micrometers).

The particulate material useful in the invention can be in the form of glass and ceramic bubbles or beads, flakes, or powder, as long as the viscoelastic can wet the surface of the material. The particulate material can vary in size, but should not be greater than the thickness of the damping material layer. Preferably, the particulate material is on the size order of about 0.1 to about 5 micrometers and more preferably about 0.1 to about 2 micrometers.

The particulate material can be composed of any material that increases the damping capability of the viscoelastic damping material.

Examples of usefill particulate materials in applications of the present invention include coated or uncoated glass and ceramic bubbles or beads such as thermally conductive bubbles, powders such as aluminum oxide powder and aluminum nitride powder, silica, cured epoxy nodules, and the like, i.e., those having a modulus of at least about 10,000 psi ($6.9 \times 10^7$ Pascals), are preferred. More preferably, useful particulate materials have a Young's modulus of about 100,000 psi ($6.9 \times 10^8$ Pascals), and most preferable are those with a modulus of at least 1,000,000 psi ($6.9 \times 10^9$ Pascals). Blends of a particulate material and fibrous material can be used from about 0.5 wt % to about 70 wt % based on the weight % of damping material.

In addition to fibers and particulate material, the vibration damping material of the present invention can include additives such as fillers (e.g. talc, etc.), colorants, toughening agents, fire retardants, antioxidants, antistatic agents, and the like. Sufficient amounts of each of these materials can be used to effect the desired result.

The damped rotatable storage article of the invention utilizes the damping of viscoelastic materials with a minimum impact on the rotatable storage article structural geometry and stiffness. Thus, the rotatable storage articles of the present invention are good candidates for products that require added vibration and shock resistance in tight geometry applications and/or sensitive weight applications. In addition, the damped storage article allows storage (e.g., data, information, etc. ) on one or both sides of the rotatable storage article, if desired, whereas an add-on free layer or constrained layer damper would limit storage to one side of the article. Thinner articles may also be possible, as the addition of damping material to an inner layer of the laminate may eliminate the need for added stiffness or mass to help reduce the effects of vibrations or shock.

The internally damped laminate of the present invention will be better understood by reference to the following FIGS. 1–4.

FIG. 1 is a schematic of one embodiment of the present invention showing a top view of a rotatable disk storage article 1 having an interior continuous single layer of a damping material. The rotatable storage article 1 has an overcoat 3a such as polycarbonate to protect the information storage layer, outer radius 7, and inner radius 5.

Figure 2:
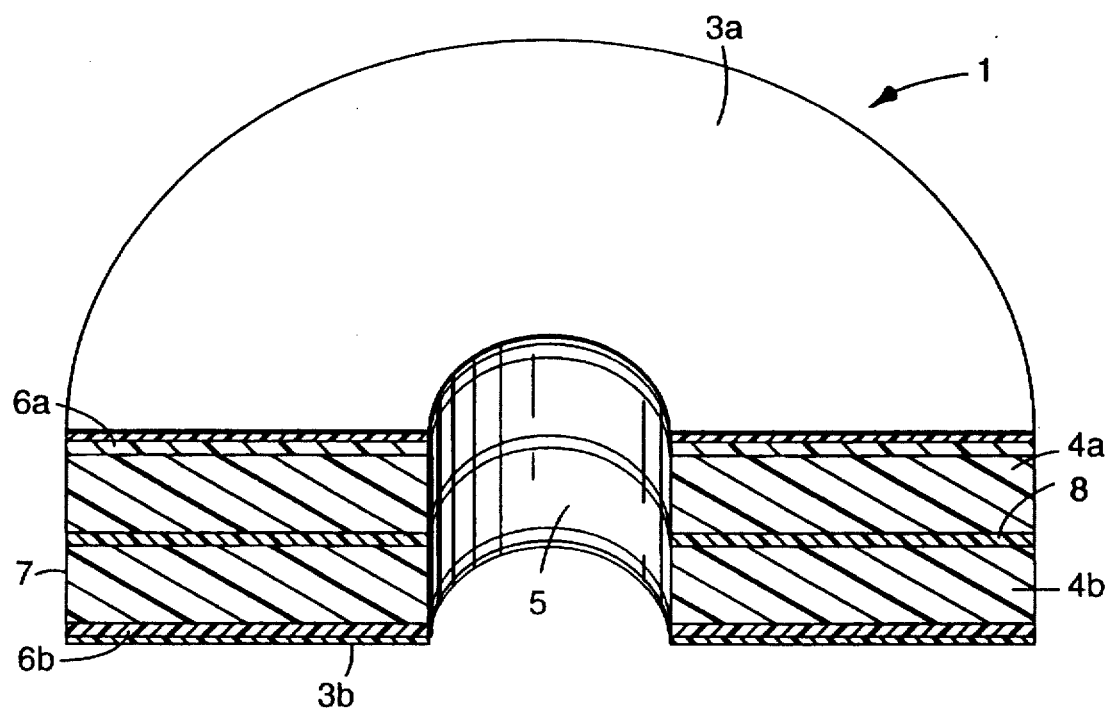
FIG. 2 is a schematic of a "disk type" rotatable storage article of the present invention showing a cross-section of the rotatable storage article of FIG. 1 having one layer of damping material.

FIG. 2 is a schematic of one embodiment of the present invention showing a cross section of a rotatable disk storage article 1 of FIG. 1 taken along line 2—2. The article 1 has a continuous layer of a damping material 8 bonded between supporting; structural materials 4a and 4b. The disk 1 also includes information storage layers 6a and 6b, and overcoat layers 3a and 3b.

Figure 3:
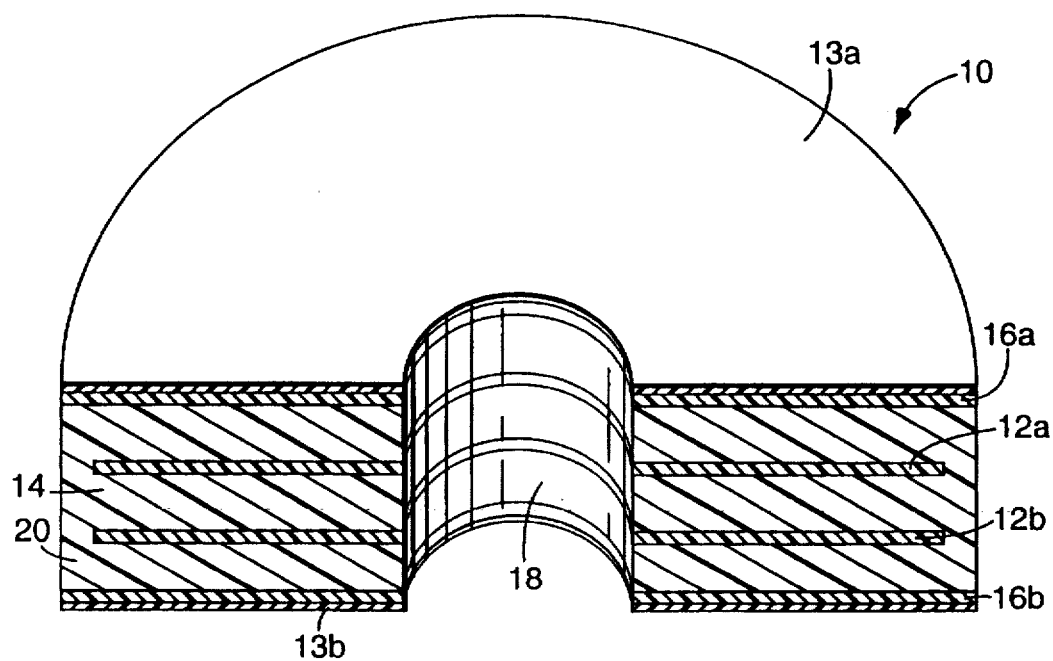
FIG. 3 is a schematic of an alternative embodiment of the present invention showing a cross-section of a rotatable storage article having two layers of damping material which are not exposed at the article outer perimeter.

FIG. 3 is a schematic of an alternative embodiment of the present invention showing a cross section of a rotatable storage article 10 having two layers of damping material 12a and 12b which are not exposed at the article outer perimeter. The damping layers 12a and 12b are positioned between supporting structural material 14. The article 10, which has an inner radius 18 and an outer radius 20, also includes information storage layers 16a and 16b and overcoat layers 13a and 13b.

Figure 4:
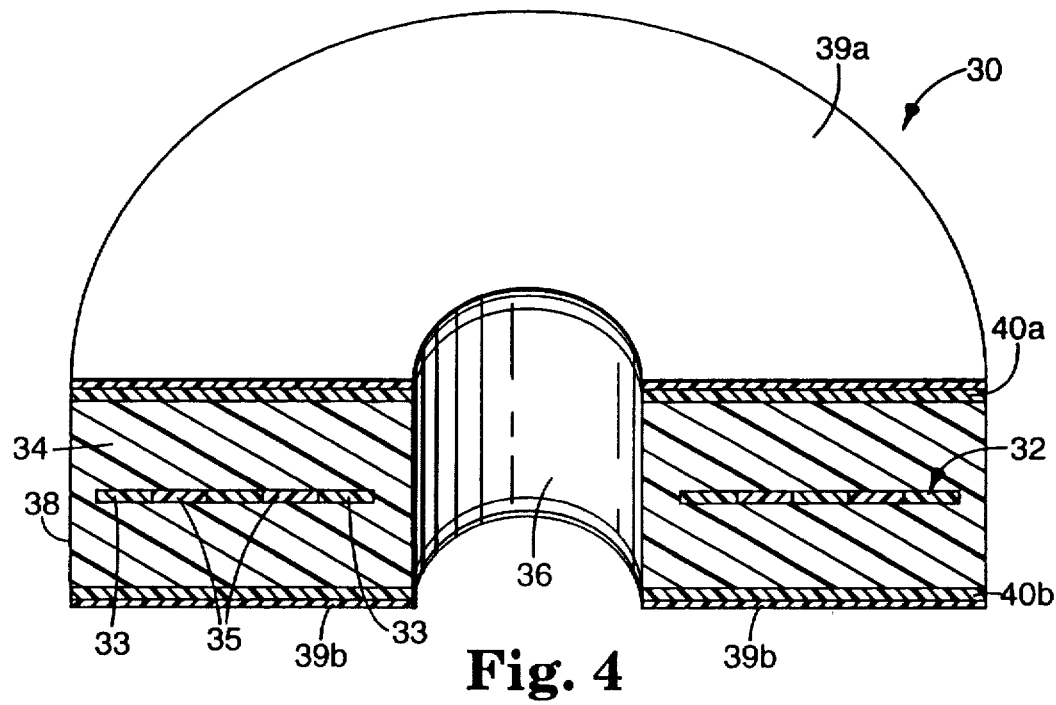
FIG. 4 is a schematic of an alternative embodiment of the present invention showing a cross-section of a rotatable storage article having a single discontinuous layer of damping material which is not exposed at the inner or outer perimeter of the article.

FIG. 4 is a schematic of an alternative embodiment of the invention showing a cross section of a rotatable storage article 30 having a single discontinuous layer of damping material 32, which is not exposed at the article 30 outer perimeter. The damping layer 33 is made up of adjacent sections of a first damping material 33 and a different damping material 35. Alternatively the material 35 could, for example represent a nondamping material or even a space. The damping layer 32 is placed within supporting structural material 34. The article 30 which has an inner radius 36 and an outer radius 38 also includes information storage layers 40a and 40b, as well as overcoat layers 39a and 39b.

Figure 4B:
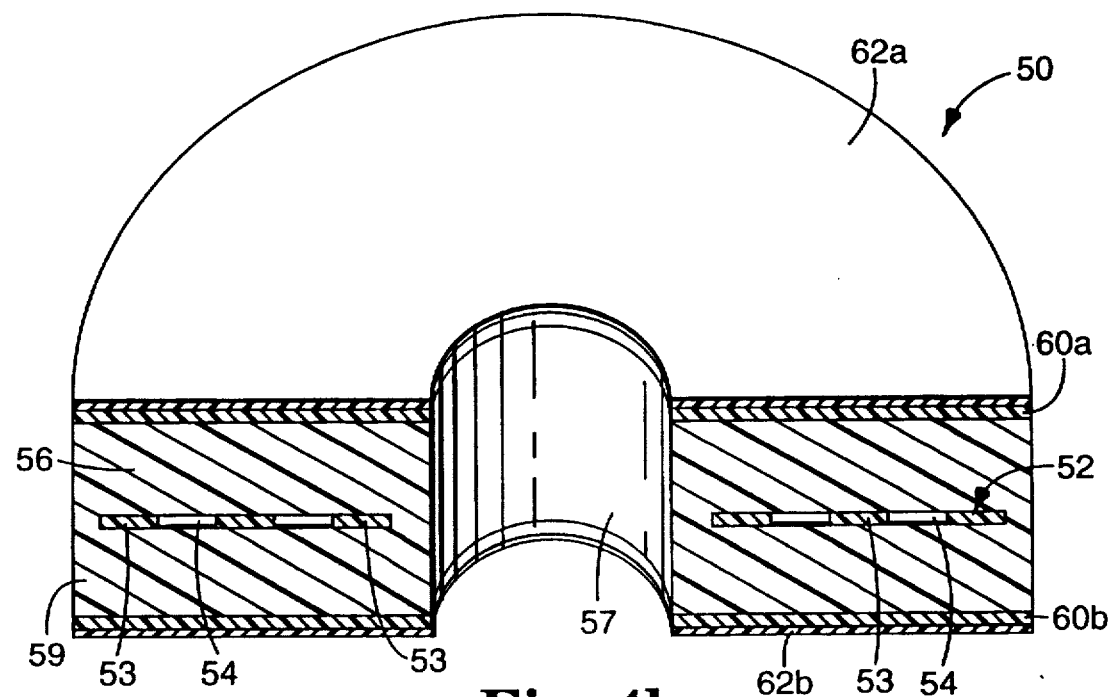
FIG. 4b is a schematic of an alternative embodiment of the present invention showing a cross-section of rotatable storage article having a single discontinuous layer of damping material which is not exposed at the inner or outer perimeter of the article.

FIG. 4b is a schematic of an alternative embodiment of the invention showing a cross section of a rotatable storage article 50 having a single discontinuous layer of damping material 52, which is not exposed at the article 50 outer perimeter. The damping layer 52 is made up of adjacent sections of a first damping material 53 and spaces 54. The damping layer 52 is placed within supporting structural material 56. The article 50 which has an inner radius 57 and an outer radius 59 also includes information storage layers 60a and 60b, as well as overcoat layers 62a and 62b.

Those skilled in the art can select the best means to introduce the damping material into a specific process based on the needs of the final damped laminate rotatable storage article and also limitations in processing capabilities of the laminate input materials.

The vibrational damping material can include a viscoelastic material or a combination of viscoelastic material with a fibrous or particulate material. It is to be understood that the vibration damping material can include a blend of viscoelastic materials as well as a variety of different fibrous or particulate materials. Blends of fibreous and particulate material are also possible.

The desired thickness of the damping material is typically 0.002 mm to 0.5 mm; preferably, 0.02 mm to 0.15 mm; and most preferably, 0.02 mm to 0.05 mm. Typically, the thickness of the damping material is about 0.5 to about 50% of the thickness of the article, more typically about 1 to about 25%. The rotatable storage article of the invention typically contains at least 1 damping layer, more typically 1–3 layers, preferably 1–2, most preferably 1 for reasons of simplicity of the storage article's manufacturing process and cost. Stiffness may be sacrificed when more than 1 layer is included. However, a wider temperature range of damping is possible when multiple layers of different damping materials are included. The amount of damping material used can vary. Sufficient material should be used to obtain the desired damping effect while balancing the structural requirements of the article. The vibration damping layer may be continuous or discontinuous. A continuous layer may comprise the same material or adjacent sections of different vibration damping materials, for example. A discontinuous layer may comprise sections of damping material separated by nondamping material and/or spaces, for example. When 2 or more layers are present the layers may comprise the same or different damping material and each may be continuous or discontinuous.

When the article contains a single layer of vibration damping material preferably the layer is positioned within the article at a distance of at least about 5%, more preferably at least about 30% of the thickness of the article from an upper and lower surface of the article. When the article has one layer of damping material most preferably it is positioned equidistant from an upper surface of the article and a lower surface of the article. When the article contains at least two layers of vibration damping material preferably each damping material layer is positioned within the article such that it is at least about 5% of the thickness of the article away from an upper and lower surface of the article and each vibration damping material layer is preferably at least about 5%, more preferably at least about 20% and most preferably at least about 30% of the thickness of the article away from another vibration damping layer.

The rotatable storage article of the present invention can be made by any suitable technique for creating rotatable storage articles as understood by those in the industry. These techniques are generally known to those of skill in the art.

For example, a damped rotatable rigid disk for a disk drive application can be made by adding a single layer of a damping material 0.025 mm thick near the center of a disk by laminating a layer of aluminum with a layer of suitable damping material and as additional layer of aluminum. This laminate is then stamped with a tool to yield a disk that has an inner damping layer. The disk "blank" is further processed to define edge and surface requirements and a read and writable data storage surface is added. The finished damped rotatable disk will have increased damping over the non-damped disk of the same process.

Examples of rotatable storage articles which may be damped internally include but are not limited to those selected from the group consisting of magnetic rotatable storage articles such as rigid disks, floppy disks, and drums; optical rotatable storage articles such as compact disks, optical disks, and drums; magneto optical rotatable storage articles such as compact disks, optical disks, drums; and mechanical rotatable storage articles such as vinyl records.

EXAMPLES

The invention has been described with reference to various specific and preferred embodiments and will be further described by reference to the following detailed examples. It is understood, however, that there are many extensions, variations, and modifications on the basic theme of the present invention beyond that shown in the examples and detailed description, which are within the spirit and scope of the present invention. All parts, percentages, ratios, etc. in the Specification and the Examples are by weight unless indicated otherwise.

Example 1 and Comparative Examples 1–3

In order to evaluate the performance of an internally damped rotatable article a sample article was prepared by adding a layer of a 0.051 mm damping material into the aluminum disk construction (Example 1) and compared to the performance of a disk construction that was bonded together with a non-damping adhesive material adhesive (Comparative Example 2), and a disk construction without a damping layer or adhesive layer (Comparative Example 1).

Description of Sample

For the purpose of demonstrating the invention, an acrylic damping material was used in the damped disk build-up in a single layer. The damping material used was an acrylic polymer that had a loss factor greater than 0.5 for a broad frequency range (±1000 Hz) at the desired test temperature (20° C./72° F.). The acrylic damping polymer selected was 3M Scotchdamp™ ISD-112, SJ2015 type 1202 available from Minnesota Mining and Manufacturing Company, St. Paul, Minn.).

Example 1

A 0.051 mm thick sheet of acrylic polymer damping material (3M Scotchdamp™ ISD-112) was placed between two 68.26 mm diameter aluminum disks, each having a 17.46 mm diameter center hole and a thickness of 0.7112 mm, to form a construction. The acrylic polymer sheet completely covered the inner surface of each aluminum disk. The construction was subjected to hand pressure for about 1 minute and then rolled with a 4.5 kg. roller to affect a bond between the acrylic polymer sheet and the two aluminum disks to provide an internally damped disk article. Although the disk article did not have any information storage layers we believe, it is representative of a disk that would have such storage layers.

The internally damped disk article was then tested as follows: Using a C-clamp, the internally damped disk article was secured at its center to a rigid table. The disk was then excited with an electromagnetic transducer (Electro 3030 HTB A) at a point 2 mm from its outer edge where a small piece of steel had been bonded. The resulting acceleration was measured with an accelerometer (Endevco Model 22) at a point diametrically opposite to the excitation point and at 2 mm from its outer edge. The transfer function was calculated from the acceleration measurement using a Tektronix 2630 Fourier Analyzer. Each transfer function was the average of 100 measurements. The transfer function thus obtained is represented graphically as a function of frequency in FIG. 5, as plot A.

The measurement of the damping is determined by calculating the system loss factor for the disk article design at the desired resonant frequency. The "system loss factor" is defined as: the width (Hz) of the resonant peak at 3 db below the resonant frequency of peak amplitude/the resonant frequency (Hz) at peak amplitude.

The system loss factor and the frequency are reported in Table 1 under Ex. 1.

Comparative Example 1

In this comparative example, a laminate was prepared and tested as in Example 1 except that no acrylic polymer sheet was used and the two aluminum disks were merely placed one on top of the other. The system loss factor and the frequency are reported in Table 1 under Comp. Ex. 1. The C-clamp used in the test method served to hold the two disks together during testing.

Comparative Example 2

In this comparative example, a laminate was prepared and tested as in Example 1 except that a 0.0254 mm thick layer of non-damping cyanoacrylate adhesive (Pronto™ Brand Instant Adhesive CA-8, available from 3M Company) was used in place of the acrylic polymer sheet. The transfer function thus obtained is represented graphically in FIG. 5, as plot B. The system loss factor and the frequency are reported in Table 1 under Comp. Ex. 2.

TABLE 1

| Example No. | Frequency (Hz) | System Loss Factor |
|---|---|---|
| Ex. 1 | 1850 | 0.243 |
| Comp. Ex. 1 | 2200 | 0.022 |
| Comp. Ex. 2 | 2500 | 0.020 |

Figure 5:
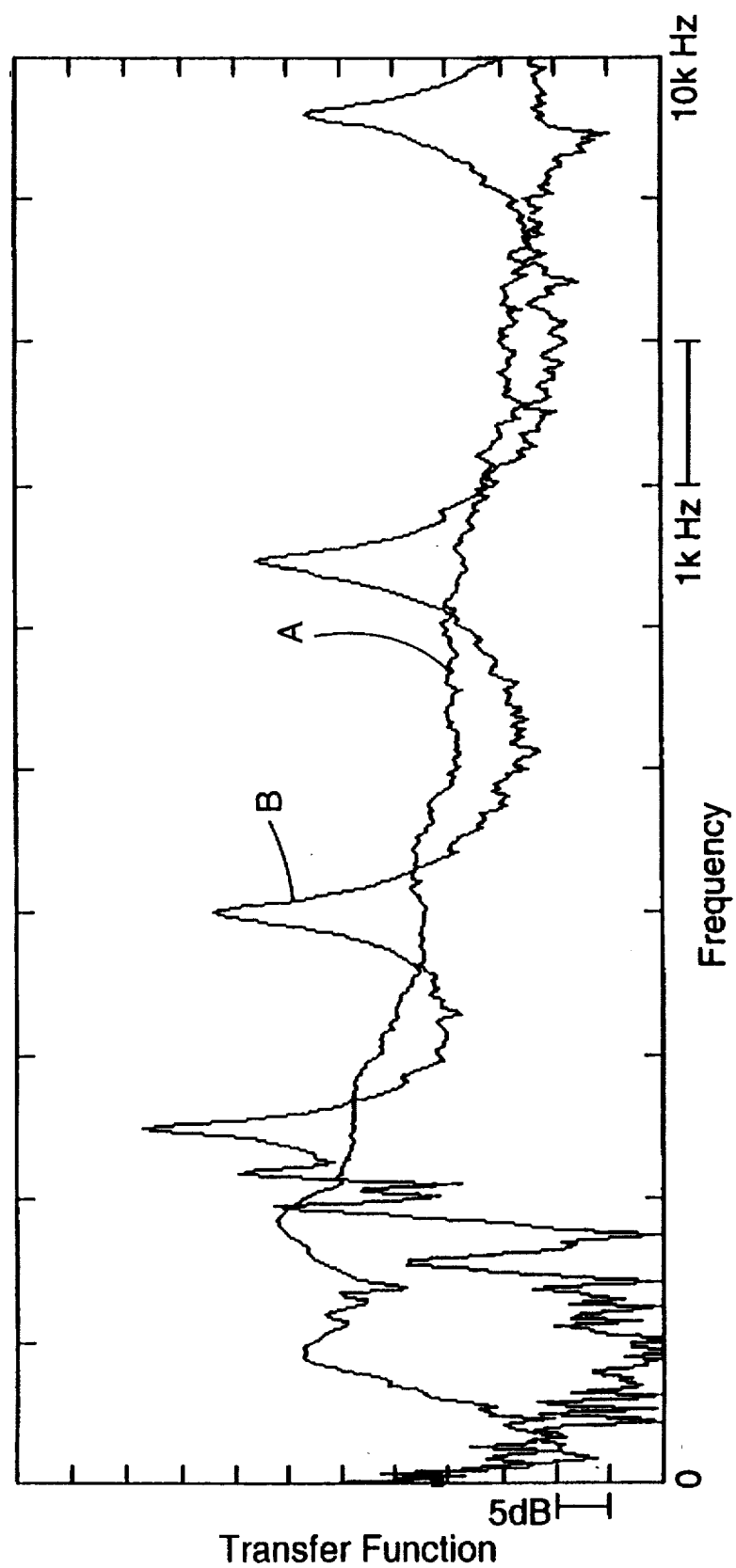
FIG. 5 is a graph of frequency versus transfer function for Example 1 and Comparative Example 2 identified as A and B, respectively.

From the data in Table 1 it can be seen that the system loss factor of the internally damped disk article (Ex. 1) is about 10 times greater than disk constructions of Comparative Examples 1 and 2 which demonstrates the superior damping performance of the internally damped disk article. FIG. 5 demonstrates the superior damping properties of a laminate representing the rotatable storage article of the invention compared to a laminate containing an internal adhesive layer which is not a damping material.

The foregoing detailed description and example have been given for clarity of understanding only. No unnecessary limitations are to be understood therefrom. The invention is not limited to the exact details shown and described, for variations obvious to one skilled in the art will be included within the invention defined by the claims.

What is claimed is:

1. An internally damped rotatable storage article having at least one layer of vibration damping material contained therein, comprising a viscoelastic material, said vibration damping material having a loss factor of at least about 0.01 and a storage modulus of at least about $6.9 \times 10^3$ Pascals, wherein the thickness of each of said layer(s) ranges from about 0.002 mm to about 0.5 mm, and wherein the vibration damping is improved by at least about 10% in at least 1 vibrational mode.

2. The rotatable storage article of claim 1 wherein the thickness of each of said layer(s) ranges from about 0.02 mm to about 0.15 mm.

3. The rotatable storage article of claim 1 wherein the thickness of each of said layer(s) ranges from about 0.02 mm to about 0.05 mm.

4. The rotatable storage article of claim 1 wherein the thickness of each of said layer(s) of vibration damping material is about 0.5 to about 50% the thickness of the article.

5. The rotatable storage article of claim 1 wherein the thickness of each of said layer(s) of vibration damping material is about 1 to about 25% of the thickness of the article.

6. The rotatable storage article of claim 1 wherein the viscoelastic material has a loss factor greater than about 0.1 and a storage modulus of at least about $6.9 \times 10^4$ Pascals.

7. The rotatable storage article of claim 1 wherein the viscoelastic material has a loss factor of 0.5 to about 10 and a storage modulus of about $6.9 \times 10^4$ to about $1.4 \times 10^7$ Pascals.

8. The rotatable storage article of claim 1 wherein the viscoelastic material is selected from the group consisting of thermoplastic polymers, thermosetting polymers, and mixtures thereof.

9. The rotatable storage article of claim 1 wherein the viscoelastic material is a thermosetting polymer.

10. The rotatable storage article of claim 9 wherein the thermosetting polymer is an acrylate.

11. The rotatable storage article of claim 1 selected from the group consisting of magnetic rotatable storage articles, optical rotatable storage articles, magneto-optical rotatable storage articles, and mechanical rotatable storage articles.

12. The rotatable storage article of claim 1 selected from the group consisting of magnetic rigid disks, magnetic floppy disks, magnetic drums, optical compact disks, optical disks, optical drums, magneto- optical compact disks, magneto-optical disks, magneto-optical drums and vinyl records.

13. The rotatable storage article of claim 1 wherein said rotatable storage article contains at least 2 layers of vibration damping material.

14. The rotatable storage article of claim 1 wherein the vibration damping material further comprises a fibrous material.

15. The rotatable storage article of claim 14 wherein the vibration damping material includes about 3 to about 60 weight percent fibrous material, based on the total weight of the vibration damping material.

16. The rotatable storage article of claim 1 wherein the vibration damping material further comprises a particulate material.

17. The rotatable storage article of claim 16 wherein the particulate material is selected from the group consisting of glass bubbles, glass beads, ceramic bubbles, ceramic beads, thermally conductive bubbles, aluminum oxide powder, aluminum nitride powder, silica, and cured epoxy nodules.

18. The rotatable storage article of claim 1 wherein the vibration damping material includes about 0.5 to about 70 weight percent of particulate material based on the total weight of the vibration damping material.

19. The rotatable storage article of claim 1 wherein the vibration damping material further comprises a fibrous material and a particulate material.

20. The rotatable storage article of claim 1 which contains a single layer of vibration damping material wherein said layer is positioned within the article at a distance of at least about 5% of the thickness of the article from an upper and lower surface of the article.

21. The rotatable storage article of claim 1 which contains a single layer of vibration damping material wherein said layer is positioned within the article at a distance of at least about 30% of the thickness of the article from an upper and lower surface of the article.

22. The rotatable storage article of claim 1 wherein the rotatable storage article has one layer of damping material positioned equidistant from an upper surface of the article and a lower surface of the article.

23. The rotatable storage article of claim 1 which contains at least two layers of vibration damping material wherein each damping material layer is positioned within the article such that it is at least about 5% of the thickness of the article away from an upper and lower surface of the article and each vibration damping material layer is at least about 5% of the thickness of the article away from another vibration damping layer.

24. The rotatable storage article of claim 1 which contains at least two layers of vibration damping material wherein each damping material layer is positioned within the article such that it is at least about 5% of the thickness of the article away from an upper and lower surface of the article and each vibration damping material is at least about 20% of the article thickness away from another damping layer.

25. The rotatable storage article of claim 1 which contains at least two layers of vibration damping material wherein each damping material layer is positioned within the article such that it is at least about 5% of the thickness of the article away from an upper and lower surface of the article and each vibration damping material is at least about 30% of the article thickness away from another damping layer.

26. The rotatable storage article of claim 1 wherein the vibration damping material further comprises an epoxy resin material, wherein said epoxy resin material may optionally have vibration damping properties.

27. The rotatable storage article of claim 1 wherein the vibration damping layer is a continuous layer.

28. The rotatable storage article of claim 1 wherein the vibration damping layer is a continuous layer made up of adjacent sections of different vibration damping materials.

29. The rotatable storage article of claim 1 wherein the article contains at least 2 layers of vibration damping material, wherein at least 2 of the layers comprise different damping materials.

30. The rotatable storage article of claim 1 wherein the vibration damping layer is a discontinuous layer.

31. The rotatable storage article of claim 30 wherein the discontinuous layer comprises sections of damping material separated by non-damping material or spaces.

32. The rotatable storage article of claim 1 wherein each vibration damping material layer is encased within the storage article.

33. A method of improving the viscoelastic damping characteristics of a rotatable storage article comprising providing at least one layer of vibration damping material within the rotatable storage article, each vibration damping material layer comprising a viscoelastic material, said vibration damping material having a loss factor of at least about 0.01 and a storage modulus of at least about $6.9 \times 10^3$ Pascals, wherein the thickness of each of said layer(s) ranges from about 0.002 mm to about 0.5 mm, and wherein the vibration damping is improved by at least about 10% in at least 1 vibrational mode.

* * * * *